(12) United States Patent
Kirby

(10) Patent No.: US 8,590,308 B2
(45) Date of Patent: Nov. 26, 2013

(54) BLEED VALVE ARRANGEMENT

(75) Inventor: Stuart J. Kirby, Derby (GB)

(73) Assignee: Rolls-Royce PLC, London (GB)

( * ) Notice: Subject to any disclaimer, the term of this patent is extended or adjusted under 35 U.S.C. 154(b) by 1170 days.

(21) Appl. No.: 12/457,298

(22) Filed: Jun. 5, 2009

(65) Prior Publication Data

US 2010/0043447 A1 Feb. 25, 2010

(30) Foreign Application Priority Data

Jun. 16, 2008 (GB) .................................. 0810883.9

(51) Int. Cl.
*F02C 6/08* (2006.01)
*F02C 9/18* (2006.01)

(52) U.S. Cl.
USPC .................................. 60/725; 60/785; 60/795

(58) Field of Classification Search
USPC .................. 60/226.1, 725, 782, 785, 795
See application file for complete search history.

(56) References Cited

U.S. PATENT DOCUMENTS

| | | | |
|---|---|---|---|
| 5,160,241 A | | 11/1992 | Glynn |
| 5,477,673 A | * | 12/1995 | Blais et al. ...................... 60/785 |
| 5,531,565 A | | 7/1996 | Meindl et al. |
| 6,048,171 A | * | 4/2000 | Donnelly et al. ............. 415/145 |
| 6,615,576 B2 | * | 9/2003 | Sheoran et al. ................ 60/39.5 |
| 7,249,929 B2 | * | 7/2007 | Cummings et al. ........... 415/144 |
| 2003/0051482 A1 | | 3/2003 | Charon et al. |
| 2003/0223863 A1 | | 12/2003 | Laurello et al. |
| 2007/0086885 A1 | * | 4/2007 | Appleby et al. ............... 415/145 |
| 2008/0115503 A1 | * | 5/2008 | Vasquez et al. ................. 60/785 |

FOREIGN PATENT DOCUMENTS

| | | |
|---|---|---|
| EP | 0 902 179 A2 | 3/1999 |
| EP | 1 106 786 A2 | 6/2001 |
| EP | 1 775 477 A2 | 4/2007 |
| FR | 1 402 436 | 5/1965 |
| GB | 2 443 418 A | 5/2008 |
| JP | A-58-202399 | 11/1983 |

OTHER PUBLICATIONS

R.H. Self, Jet Noise Prediction Using the Lighthill Acoustic Analogy, Journal of Sound and Vibration, vol. 275, pp. 1-3, Elsevier 2003.*
Jan. 14, 2013 European Search Report issued in European Patent Application No. EP 09 25 1490.

* cited by examiner

*Primary Examiner* — Ehud Gartenberg
*Assistant Examiner* — Karthik Subramanian
(74) *Attorney, Agent, or Firm* — Oliff & Berridge, PLC

(57) ABSTRACT

Problems can arise with regard to noise created by bleed valve arrangements in gas turbine engines. It is known to utilize pressure differential inducing elements such as pepper pots and perforated surfaces in order to attenuate noise from bleed valves. However, these arrangements tend to have a portion which expands such that the exit aperture into a bypass duct wall can significantly affect mechanical strength and operational performance. By providing internally created pepper pots or other pressure differential inducing elements within a path of an arrangement and a constriction to an exit noise attenuation is still achieved but with less detrimental effect with regard to bypass duct wall strength and aerodynamic losses altering operational performance.

14 Claims, 3 Drawing Sheets

BLEED VALVE ARRANGEMENT

The present invention relates to bleed valve arrangements for a gas turbine engine and particularly in relation to bleed valve arrangements utilised to release compressed air from a compressor stage to a bypass duct of the engine.

Bleed valves are well known within gas turbine engines in order to allow adjustment of the operability of the engine in relation to compressed air flows through the engine in use. In such circumstances relatively hot air from a high pressure stage of the engine passes through the bleed valve and into a relatively cool bypass flow in a bypass duct. It will be understood that the bleed flow will typically be intermittent and will occur when there is transience within the engine. As engines become quieter the differentials in the bleed flow into the bypass flow in terms of noise are discernable.

In the above circumstances in order to abate and reduce the noise created by bleed flows into the bypass flow it has been proposed to use perforated plates, in the form of pepper pots, or baffle plates. Such features create a pressure differential which acts to adjust bleed flow rates and reduce levels of noise created by release of bleed flows into the bypass flow. Such pepper pot arrangements in association with operable valves are effective with regard to noise reduction. However, typically to create best effects a cascade of pepper pots are required with each sequential pepper pot of greater cross sectional area. In such circumstances the necessary outlet aperture in the bypass duct wall can be greater than acceptable. It will be understood that creating apertures in bypass walls will inherently reduce the strength of such bypass elements within a gas turbine engine. Furthermore, accommodation of the aperture with respect to other functional features within the gas turbine engine can be difficult.

In accordance with aspects of the present invention there is provided a bleed valve arrangement for a gas turbine engine, the arrangement comprising a pressure differential inducing element to inhibit fluid flow for noise level shift, the pressure differential inducing element in a path towards an outlet formed in a duct for a bypass flow, the arrangement characterised in that the path defines a constriction in area at the outlet relative to a portion of the path between the pressure differential inducing element and the outlet.

Typically, the pressure inducing element comprises a perforated surface. Generally, the perforated surface is curved to provide vibration resistance. Typically, the perforations are angled to direct flow.

Alternatively, the pressure inducing element comprises a valve. Further alternatively, the pressure inducing element comprises a baffle plate.

Typically, there are a plurality of pressure differential inducing elements.

Typically the path is between the duct and a compressor stage of a gas turbine engine. Generally, the path is angled. Possibly, the path includes a curve.

Generally, there is a ratio between the cross sectional area of the portion of the path relative to the constriction to provide a desired level of sudden expansion for a fluid flow after the outlet. Typically, the portion of the path is the greatest cross sectional area of the path. Typically, the ratio is greater than 1. Possibly, the ratio is in the range 1 to 10. Advantageously, the ratio is substantially 3.

Generally the constriction comprises an aperture to form the outlet in the duct. Generally, the outlet includes vanes or vents to direct and/or limit the fluid flow through the outlet.

Also in accordance with aspects of the present invention there is provided a gas turbine engine incorporating a bleed valve arrangement as described above.

Aspects of the present invention will now be described by way of example and with reference to the accompanying drawings in which.

Figure 1:
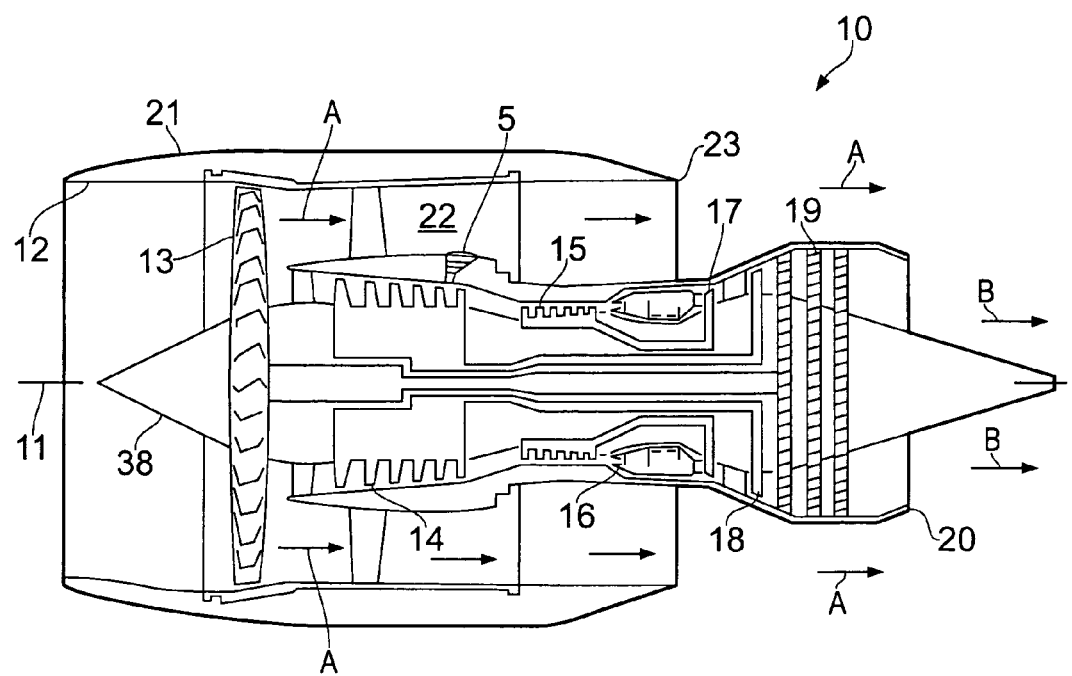
FIG. 1 is a schematic illustration of a gas turbine engine.

FIG. 1 provides a schematic illustration of a gas turbine engine 10. The gas turbine engine rotates about an axis 11 with generally an outer housing 21, defining an inlet 12, and a core defined by a shaft upon which a low pressure compressor 13, an intermediate pressure compressor 14 and a high pressure compressor 15 are associated with reciprocal turbines 17, 18, 19. In operation the compressors 13, 14, 15 compress a fluid flow into a combustor 16 in order to drive operation of the engine 10. The core typically incorporates an initial nose cone 38 such that the low pressure compressor 13 provides compression into the subsequent compressors 14, 15 as well as a bypass flow in the direction of arrowheads A through a bypass duct 22. At the rear of the engine 10, an exhaust 20 is provided such that the bypass flow A shrouds the exhaust or thrust flow B. In order to balance flow through the engine 10 in terms of the compressors 13, 14, 15 and turbines 17, 18, 19 typically bleed valve arrangements 5 are provided between compressors 14, 15 and the bypass duct 22 of the engine 10. In such circumstances when required compressed air flow can be bled to the duct 22 in order to regulate and control operation of the engine 10. As engines have become quieter operation of the bleed valve arrangements 5 has become more noticeable in terms of noise. Although operation of the bleed valve arrangements 5 will be intermittent and relatively short term the noise created may be unacceptable particularly whilst near the ground.

Figure 2:
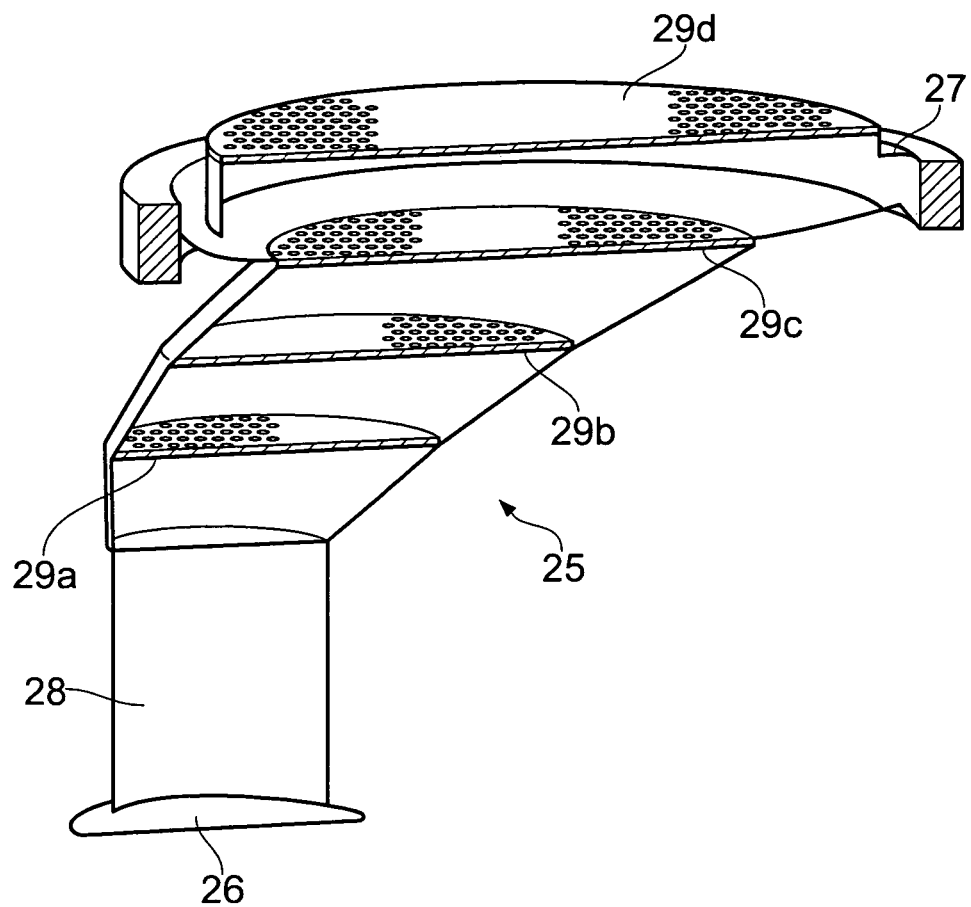
FIG. 2 is a schematic half cross section of a typical prior bleed valve arrangement.

FIG. 2 provides a typical example of a prior bleed valve arrangement 25 utilised in order to reduce noise. In such circumstances the bleed valve arrangement 25 comprises an inlet 26 and an outlet 27. The inlet 26 as indicated above will generally be associated with a compressor stage of a gas turbine engine (not shown). The outlet 27 will be formed in the wall of the bypass duct of the gas turbine engine. In order to allow operability with regard to the arrangement 25 typically an inlet portion 28 will include an operable valve to allow elective switching of bleed flows from the compressor core to the bypass duct through the inlet 26 and the outlet 27. The valve itself will provide a pressure differential inducing element which will adjust the bleed flow and therefore provide some noise attenuation. However, in order to achieve acceptable levels generally perforated surfaces 29 will be provided. These perforated surfaces 29 incorporate holes which present a constriction to the bleed flow between the inlet 26 and the outlet 27. In such circumstances a pressure differential is created so that in order to maintain flow generally the arrangement 25 incorporates a portion of a path between the inlet 26 and the outlet 27 which expands. An unfortunate consequence of such expansion is that the outlet 27 is generally quite large and therefore is unacceptable in terms of the structurally weakening effects upon a wall part of the bypass duct incorporating the arrangement 25.

It will be appreciated that noise is created by the bleed flow into the bypass flow. The noise created is a result of shock waves and turbulent mixing. The bleed flow from the compressor is generally of a higher velocity than the bypass flow. In such circumstances unless controlled the high velocity fluid flow from the bleed valve arrangement separates the bypass flow from the walls of the duct. This creates shock waves and turbulent mixing which dissipates the velocity and thus converts the pressure energy into kinetic energy which is then converted into heat in the turbulent flow within the bypass flow. Pressure energy is converted to kinetic energy and then into heat energy in loosing the pressure from the bleed flow. This process can be noisy. Noise is created through aerodynamic processes and its magnitude is very strongly related to the peak bleed flow velocities within the arrangement. Peak velocity is directly related to the pressure ratio across each expansion within a bleed valve arrangement. These expansions are provided as indicated above generally through an expansion of the path between the inlet and outlet for the bleed valve arrangement and in particular by providing a cascade of pressure differential inducing elements along that path. These pressure differential inducing elements are typically perforated surfaces and normally take the form of pepper pots. The pepper pots are generally curved in two dimensions relative to the direction of flow in order to provide resistance to vibration and therefore more robustness with regard to location within the bleed valve arrangement. By applying several expansions through pressure differential inducing elements it will be understood that flow velocities can be reduced and so noise generation also reduced. As an alternative to perforated surfaces (pepper pots) it will also be understood that baffle plates and an operable valve can also be utilised in concert to provide the necessary cascade of expansions and pressure differentials to reduce noise.

By necessity multiple sudden expansions to reduce velocity will require a cascade incorporating generally expanding areas in terms of perforated surfaces at successive stages to deal with larger volume flow rates. Thus, as illustrated in FIG. 2 generally the outlet 29 is significantly larger than the inlet 26. With respect to gas turbine engine design accommodation for this relatively large outlet 27 can be difficult. Such apertures 27 may create structural problems particularly with regard to thrust reversers and other elements within gas turbine engines and also reduce the amount of acoustic attenuation material lining which can be provided in the bypass duct. Furthermore a relatively large outlet 27 will disturb the aerodynamics of the bypass flow resulting in aerodynamic losses over the relatively uneven surface of the outlet 27 and therefore inefficiency.

Generally, the perforated surfaces comprise approximately a third to two thirds open area in order to create the sudden expansion into the cascade of pressure differential inducing elements. It will be desirable to continue with the sudden expansion approach to noise abatement with respect to bleed flow through bleed valve arrangements. In accordance with aspects of the present invention such sudden expansion is achieved through creating an effective contraction within an outlet in comparison with a portion of the path between the inlet and outlet of a bleed valve arrangement.

Figure 3:
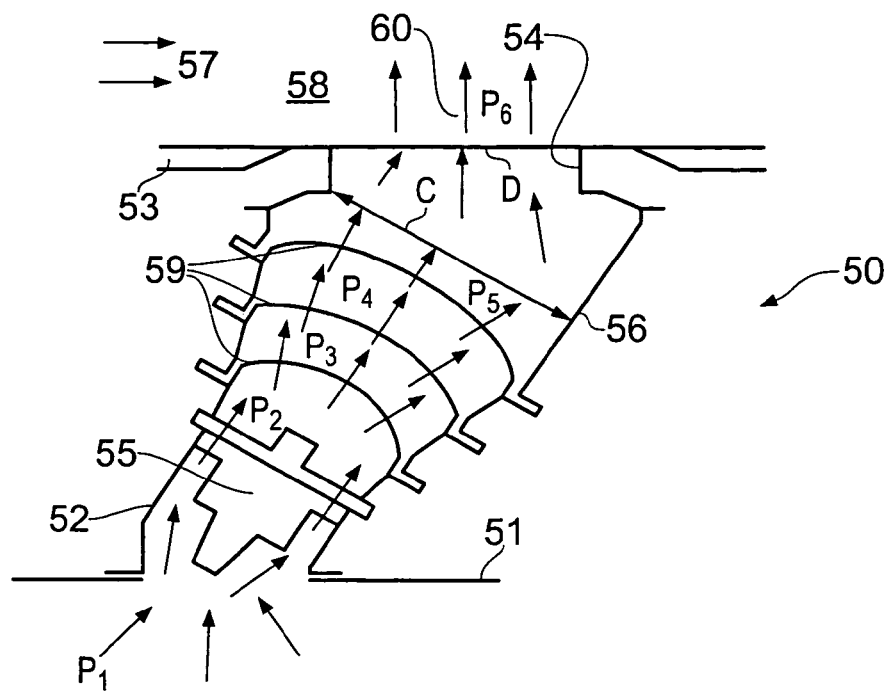
FIG. 3 is a schematic illustration of a first embodiment of a bleed valve arrangement in accordance with aspects of the present invention.

FIG. 3 provides a schematic illustration of a first embodiment of a bleed valve arrangement 50 in accordance with aspects of the present invention. In such circumstances an engine core 51 incorporates an inlet 52. The engine casing will be associated with compressor stages of a gas turbine engine (not shown). The inlet 52 defines one end of a path between the core 51 and a bypass duct wall 53. As illustrated generally the path is angled in order to marry and mate the respective inlet 52 position in the core 51 and an outlet 54 position in the duct 53. Alternatively, the path may be curved or otherwise shaped in order to provide an appropriate communication between the inlet 52 and the outlet 54.

A valve 55 is provided within the arrangement 50. The valve 55 is electively operable in order to provide a bleed flow through the arrangement 50 between the inlet 52 and the outlet 54. Within the arrangement 50 a cascade of pressure differential inducing elements typically in the form of perforated surfaces to create pepper pot elements 59 are provided. In such circumstances when operable the valve 55 opens to allow a flow as depicted by the arrowheads through the arrangement 50 such that by induced pressure differentials and sudden expansions the bleed flow is attenuated in terms of noise.

In accordance with aspects of the present invention within an exit portion 56 of the path a constriction is created such that there is sudden expansion in the bleed flow into a bypass flow 57 within a bypass duct 58.

The constriction is achieved by the outlet 54 having a reduced available area for bleed flow in comparison with a portion of the path in the exit duct 56 of the arrangement 50. Thus, the bleed flow as depicted by the arrowheads passes through the valve 55 and perforated surfaces 59 to create noise attenuation and then within the exit duct 56 wells until flow through the outlet 54 and sudden expansion.

In the above circumstances generally a final perforated surface typically in the form of a pepper pot is replaced with a plain hole outlet 54 or possibly a vaned or vented outlet. Thus, typically a two thirds blockage perforated surface is replaced with a much more open outlet 54 but with an outlet cross sectional area reduced.

Aspects of the present invention are particularly relevant to situations where the available area of the final outlet 54 is minimised for structural or other reasons. In such circumstances the design of an operational arrangement 50 will be chosen to ensure that the exit flow rate in terms of Mach number is as high as possible. Thus, the Mach number preferably is 1 or perhaps slightly lower to avoid shock waves and noise generation in the sudden expansion out of the outlet 54. Generally the flow rate cannot be greater than 1 at the throat or minimum area of the outlet 54. To create this effect the total pressure upstream in the arrangement 50 must be significantly greater than the static pressure in the bypass duct 58. This is achieved by the contraction and restriction in the arrangement 50 as described above.

By contraction and constriction of the arrangement 50 after the last pressure differential inducing element such as a pepper pot and upstream of the outlet 54 there will be produced a sudden expansion in the bleed flow through the outlet 54. It will be understood that any constriction or contraction will be useful with regard to reducing the size of the final outlet 54 but generally a ratio, between the outlet 54 and a portion of the path typically at the widest portion of the arrangement 50 after the last element 59, will be slightly greater than 1 will be used. Typically the constriction ratio between the available area of the outlet 54 and the notional exit portion of the path of the arrangement 50 will be in the range slightly greater than 1 to 10. Possibly, an advantageous ratio will be in the order of 3. The ratio is depicted in FIG. 3 as C (area of the exit portion 56) divided by D (available area of the outlet 54). The dimension C can be referred to as the length/diameter along a curved surface and is ultimately the area of the perforated plate 59. In such circumstances it will be understood that the pressures decrease from P1 to P6 consecutively.

By aspects of the present invention and reduction in the necessary size of the aperture to accommodate the exit in the bypass duct in accordance with aspects of the present invention it will be understood that configuration of bleed arrangements within gas turbine engines is rendered easier. Thus, the strength reducing effects of large aperture sizes and the weight of necessary reinforcement to accommodate for such apertures can be avoided. Furthermore acoustic material can be retained over a greater area of the duct wall 53 typically in such elements as thrust reverses or cowlings. Such acoustic material will further enhance attenuation of noise and bleed flow noise within a gas turbine engine. Reduction in the width and size of the exit 54 will also reduce aerodynamic losses and therefore improve performance.

It will be appreciated that the manner by which the bleed flow 60 is injected into the bypass flow 57 can have an effect upon operational performance. In such circumstances rather than a plain hole or aperture to provide the outlet 54 it will be understood that vanes or vents can be provided in order to angle the direction of flow 60. An example of such angling is provided in UK patent application No 0616847 and the content thereof is incorporated by reference. In such circumstances less turbulence may be created and therefore possibly a further reduction in noise created by the bleed flow into the bypass flow 57. Furthermore, it will be appreciated that it is the constriction provided between the exit portion 56 of the arrangement 50 and the outlet 54 which is important in accordance with aspects of the present invention. In such circumstances the outlet 54 may incorporate a perforated surface comprising a number of perforations with a large open area available to the bleed flow. In such circumstances it is the effective area of availability of the perforations in the perforated surface providing the exit 54 in comparison with the available cross sectional area in the exit portion 56 which will determine the appropriate ratio and therefore performance with regard to sudden expansion of the bleed flow into the bypass flow 57. A perforated surface or pepper pot with a very low blockage rate, and so not much of a reduction in pressure by the perforated surface may be substantially the equivalent of a plain hole aperture. In such circumstances the perforated surface would have a low or zero contraction ratio in its own right but the size of the exit within which the perforated surface is incorporated would define the constriction in the arrangement 50 in accordance with aspects of the present invention.

In some circumstances the relative high temperature of the bleed flow can be detrimental. Thus, it is known with regard to some bleed valve arrangements to provide for diffusion of the bleed flow with the bypass flow to essentially reduce the temperature as rapidly as possible and therefore avoid problems with respect to the high temperature bleed flow causing damage, particularly in relation to materials such as plastics which may be utilised in the bypass duct.

Figure 4:
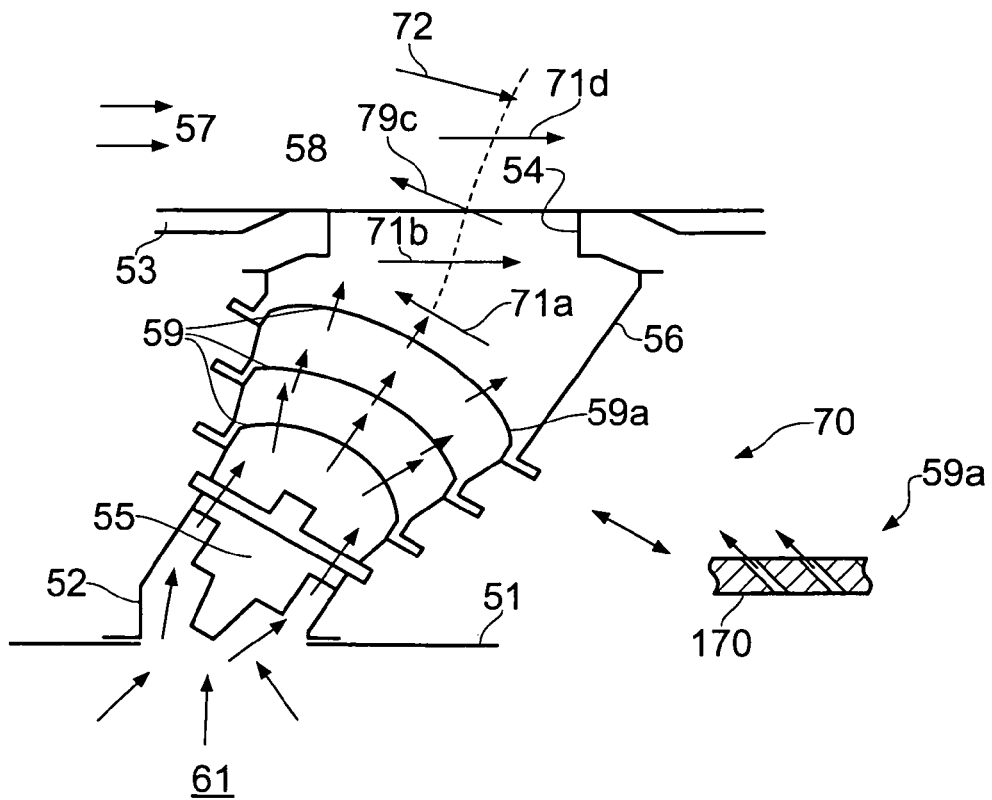
FIG. 4 is a schematic illustration of a second embodiment of a bleed valve arrangement in accordance with aspects of the present invention; and, FIG. 5 is a schematic illustration of a wall section.

Aspects of the present invention may be adapted to accommodate both for noise attenuation as well as high temperature bleed flow diffusion. For comparison equivalent elements as depicted in FIG. 4 to those depicted in FIG. 3 have the same reference numeral. In such circumstances as previously an inlet 52 is located within an engine core 51 with an outlet 54 located within a duct wall 53. A bleed flow is taken from a compressor stage 61 and passes through the inlet 52 along a path to the outlet 54 with pressure inducing elements 59 provided in order to achieve noise attenuation. The bleed flow passes through the outlet 54 into a bypass flow 57 in a duct 58.

As previously a constriction is provided between the outlet 54 and an exit portion 56 of the path defined by the arrangement 70 in accordance with aspects of the present invention. However, rather than provide a directed or simple laminar cross flow into the bypass flow 57 as provided with the first embodiment depicted in FIG. 3, in the second embodiment depicted in FIG. 4 a vortex flow is created. In such circumstances a perforated surface in the form of a pepper pot 59 is provided which incorporates perforations 170 which are angled such that the bleed flow 71 swirls. This vortex or swirl path is depicted by successive arrowheads 71a, 71b, 71c, 71d, 71e about a centre 72 of a vortex created from within the exit portion 56 through the exit 54. In such circumstances upon impingement with the bypass flow 57 diffusion occurs such that the relatively hot bleed flow 71 rapidly disperses and is cooled avoiding problems with damage to sensitive parts such as plastic components within the bypass duct 58.

As indicated generally the vortex is created by use of appropriately angled perforations in a perforated surface such as a pepper pot. Once the vortex is created within the exit portion 56 of the arrangement 70 the constriction or contraction would accelerate the vortex as it passes through the exit 54. It will also be understood that provision of a contraction or constriction with subsequent sudden expansion at the exit 54 will greatly simplify exit geometry. There will be no need for vanes or vents in the outlet to provide for appropriate incidence between bypass flow 57 and the bleed flow 71. This will avoid the potential problems with regard to such vanes or vents creating a pressure differential and so diminishing the effects of constriction in accordance with the present invention. Furthermore by creation of a vortex it will also be possible to further reduce the size of the exit 54 in the wall 53 whilst enhancing mixing with the bypass flow 57 to reduce as indicated potentially damaging temperatures in the bleed flow. Generally, by the contraction and constriction provided through aspects of the present invention it will be understood that the vortex is enhanced.

Generally in order to provide stability and appropriate noise attenuation generally the pressure differential inducing elements will be presented in a cascade. As indicated typically these pressure differential inducing element will normally take the form of a perforated surface in the shape of a pepper pot. However, baffle plates as well as the operable valve itself in accordance with aspects of the present invention may also provide pressure differential inducing elements which will facilitate noise attenuation. The perforated surfaces will normally be curved in two dimensions in order to provide resistance to vibration as the bleed flow passes through them. Such doming and curving of the perforated surfaces enhances strength relative to material thickness which has particular advantages with regard to aircraft installations.

Aspects of the present invention provide as indicated a final sudden expansion of the bleed valve arrangement to an open plain or potentially vaned/vented outlet to minimise the necessary size of the hole to define the exit. This reduction in the exit holes in the bypass wall duct will allow easier accommodation within a bypass duct as there will be a reduced effect with respect to weakening. Generally, the noise attenuation pepper pot or pressure differential inducing elements will be located internally in a path between an inlet and an outlet.

Applications and alterations to aspects of the present invention as described above will be appreciated by a person skilled in the art. In such circumstances the pressure differential inducing element as indicated will generally be provided as a cascade. Elements of different form, that is to say the operable valve, baffle plates as well as perforated surfaces may be combined as appropriate in order to create the desired necessary noise attenuation before the constriction in accordance with aspects of the present invention. The pepper pot perforated surface utilised in accordance with aspects of the present invention may be appropriately shaped in order to create the desired bleed flow. In such circumstances the surfaces may be ribbed with thinner wall sections between parts defining the perforations and apertures. In such circumstances the thicker parts have a greater functional length with respect to directing bleed flow air through and creation of desired plumes in accordance with aspects of the present invention.

Figure 5:
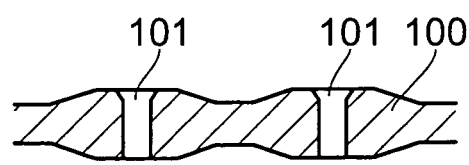

FIG. 5 illustrates schematically a wall portion 100 in which the wall section varies between thicker parts which define apertures 101 and thinner wall portions between apertures 101. In such circumstances it will be possible to provide a wall section 100 which has a reduced weight or where the material in the wall section 100 is applied appropriately to create more functionality with regard to the apertures 101 whilst retaining structural stability in the thinner portions between the thicker portions defining the apertures 101.

Thinner wall sections can be achieved by powder bed technology and, as indicated above, may allow a reduction in weight in an absolute sense or to relatively extend the length of the apertures relative to the weight of material used in order to improve performance. It will be understood a longer aperture length will give a greater degree of entrainment and so function in the pepper pot configuration at each level of surfaces.

The invention claimed is:

1. A gas turbine engine comprising:
a bypass duct wall;
a core engine casing; and
a bleed valve arrangement, wherein:
the bleed valve arrangement extends from an inlet in the core engine casing to an outlet in the bypass duct wall,
the bleed valve arrangement has a plurality of perforated plates arranged in series through which a bleed flow passes,
the bleed valve arrangement defines an exit duct well that is defined by the last perforated plate at a downstream end in which the bleed flow passes of the plurality of perforated plates and the outlet, and the exit duct well is constricted by a constriction between the last perforated plate and the outlet.

2. The gas turbine engine as claimed in claim 1 wherein a perforated surface of the perforated plates is curved to provide vibration resistance.

3. The gas turbine engine as claimed in claim 1 wherein perforations in the perforated plates are angled to direct flow.

4. The gas turbine engine as claimed in claim 1 wherein the bleed valve arrangement includes a valve.

5. The gas turbine engine as claimed in claim 1 wherein the bleed valve arrangement includes a baffle plate.

6. The gas turbine engine as claimed in claim 1 wherein a path of the bleed valve arrangement is between a bypass duct and a compressor stage of the gas turbine engine.

7. The gas turbine engine as claimed in claim 1 wherein a path of the bleed valve arrangement is angled and/or a curve.

8. The gas turbine engine as claimed in claim 1 wherein there is a ratio between a cross sectional area C of a portion of a path of the bleed valve arrangement relative to the constriction D to provide a desired level of sudden expansion for fluid flow after the outlet.

9. The gas turbine engine as claimed in claim 8 wherein the portion of the path has the greatest cross sectional area of the path.

10. The gas turbine engine as claimed in claim 8 wherein the ratio is greater than 1.

11. The gas turbine engine as claimed in claim 8 wherein the ratio is in the range 1 to 10.

12. The gas turbine engine as claimed in claim 8 wherein the ratio is substantially 3.

13. The gas turbine engine as claimed in claim 1 wherein the constriction comprises an aperture to form the outlet in the bypass duct wall.

14. The gas turbine engine as claimed in claim 1 wherein the outlet includes vanes or vents to direct and/or limit fluid flow through the outlet.

* * * * *